(12) United States Patent
Hikichi

(10) Patent No.: US 10,455,103 B2
(45) Date of Patent: Oct. 22, 2019

(54) POWER CONTROL METHOD OF PRINTING APPARATUS

(71) Applicant: CANON KABUSHIKI KAISHA, Tokyo (JP)

(72) Inventor: Atsushi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 15/458,563

(22) Filed: Mar. 14, 2017

(65) Prior Publication Data

US 2017/0289376 A1 Oct. 5, 2017

(30) Foreign Application Priority Data

Mar. 29, 2016 (JP) ................. 2016-066082

(51) Int. Cl.
*H04N 1/00* (2006.01)
*G03G 15/00* (2006.01)

(52) U.S. Cl.
CPC ..... *H04N 1/00891* (2013.01); *G03G 15/5004* (2013.01); *G03G 15/80* (2013.01); *H04N 1/00901* (2013.01); *H04N 1/00904* (2013.01); *G03G 15/5083* (2013.01); *G03G 2215/00109* (2013.01); *H04N 2201/0094* (2013.01)

(58) Field of Classification Search
USPC ........................................ 358/1.14
See application file for complete search history.

(56) References Cited

U.S. PATENT DOCUMENTS

| 5,828,462 A * | 10/1998 | Hashimoto ........ G03G 15/2003 358/296 |
| 7,107,006 B1 * | 9/2006 | Sato ................... G03G 15/6538 399/407 |
| 2004/0017112 A1 * | 1/2004 | Kim .......................... G06F 1/26 307/31 |
| 2014/0347685 A1 * | 11/2014 | Hisada ............... G06K 15/4055 358/1.13 |

FOREIGN PATENT DOCUMENTS

JP 2015-170002 9/2015

* cited by examiner

*Primary Examiner* — Neil R McLean
*Assistant Examiner* — Darryl V Dottin
(74) *Attorney, Agent, or Firm* — Venable LLP

(57) ABSTRACT

A printing apparatus includes a printer to form an image on a printing medium by using a color material and to output the printing medium on which the image is formed, a printing controller to control the printer and to store data relating to the printer, a power controller to control supply of power to the printer and the printing controller, and a main controller connected with the printing controller so as to be capable of communication. In accordance with a predetermined request, the power controller performs control so as to suspend supply of power to the printer, the main controller starts acquisition of the data stored by the printing controller, and the power controller performs control so as to suspend supply of power to the printing controller after the main controller completes acquisition of the data.

30 Claims, 4 Drawing Sheets

POWER CONTROL METHOD OF PRINTING APPARATUS

BACKGROUND OF THE INVENTION

Field of the Invention

The present invention relates to power control of a printing apparatus and in detail, relates to a control technique to suspend supply of power stepwise at the time of causing a printing unit included in a printing apparatus to make a transition into a suspended state.

Description of the Related Art

A printing apparatus (image forming apparatus), such as an MFP (Multi Function Peripheral), includes a controller configured to control a user interface (UI) and communication and a printing mechanism in charge of sheet conveyance and image formation. In the printing apparatus having the printing mechanism such as this, in the case where processing, such as printing and copying, is completed and the printing mechanism in an activated state is caused to make a transition into the suspended state, it is common to suspend supply of power to the printing mechanism after backing up various kinds of data relating to the printing mechanism in the controller. Here, data that is a target of backup is information on a use state of various consumables relating to the printing mechanism and for example, in the case of an electrophotographic printing mechanism, information obtained by counting changes in time series, such as the number of sheets passed through a fixing unit (drum) and energization time. In the following, such data relating to the printing mechanism, which is a target of backup, is referred to as "counter data". In the printing apparatus, such as an MFP, a conventional flow at the time of causing the printing mechanism to make a transition into the suspended state by the controller is roughly as follows.

1) First, counter data is acquired from the printing mechanism and backed up.

2) Next, an end request is transmitted to the printing mechanism and the printing mechanism is caused to perform various kinds of processing (hereinafter, end processing) that are necessary prior to suspension of supply of power, such as cooling down the drum, separating the fixing unit, and discharging ozone.

3) Upon receipt of completion notification of the end processing from the printing mechanism, supply of power to the printing mechanism is suspended.

In order for an application to access the counter data managed by the printing mechanism after the printing mechanism has made a transition into the suspended state, it is necessary to resume supply of power to the printing mechanism. In order to avoid the resupply of power such as this, the controller makes it possible to respond to an inquiry from an application without resupplying power to the printing mechanism by acquiring the counter data from the printing mechanism. For example, Japanese Patent Laid-Open 2015-170002 has proposed a method of caching data corresponding to the above-described counter data before a transition is made into the maintenance state (i.e., before supply of power to the printing mechanism is suspended).

In the recent MFP, there is a tendency for the number of setting items and data size of the counter data managed by the printing mechanism to increase accompanying an increase in speed and enhanced functionality of the MFP. Because of this, the backup of the counter data that is performed prior to the end processing of the printing mechanism has begun to require several tens of seconds, which required only several seconds in the past. As a result of this, in the case where the printing mechanism is caused to make a transition into the suspended state, there has occurred a situation in which the period of time during which power is supplied to the printing mechanism lengthens and power consumption increases. Consequently, an object of the present invention is to reduce power consumption without impeding backup of counter data of consumables or the like in the case where the printing mechanism of the printing apparatus is caused to make a transition from the activated state into the suspended state.

SUMMARY OF THE INVENTION

The printing apparatus according to the present invention includes: a printing unit configured to form an image on a printing medium by using a color material and to output the printing medium on which the image is formed; a printing control unit configured to control the printing unit and to store data relating to the printing unit; a power control unit configured to control supply of power to the printing unit and the printing control unit; and a main control unit connected with the printing control unit so as to be capable of communication, and in accordance with a predetermined request, the power control unit performs control so as to suspend supply of power to the printing unit, the main control unit starts acquisition of the data stored by the printing control unit, and the power control unit performs control so as to suspend supply of power to the printing control unit after the main control unit completes acquisition of the data.

Further features of the present invention will become apparent from the following description of exemplary embodiments (with reference to the attached drawings).

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
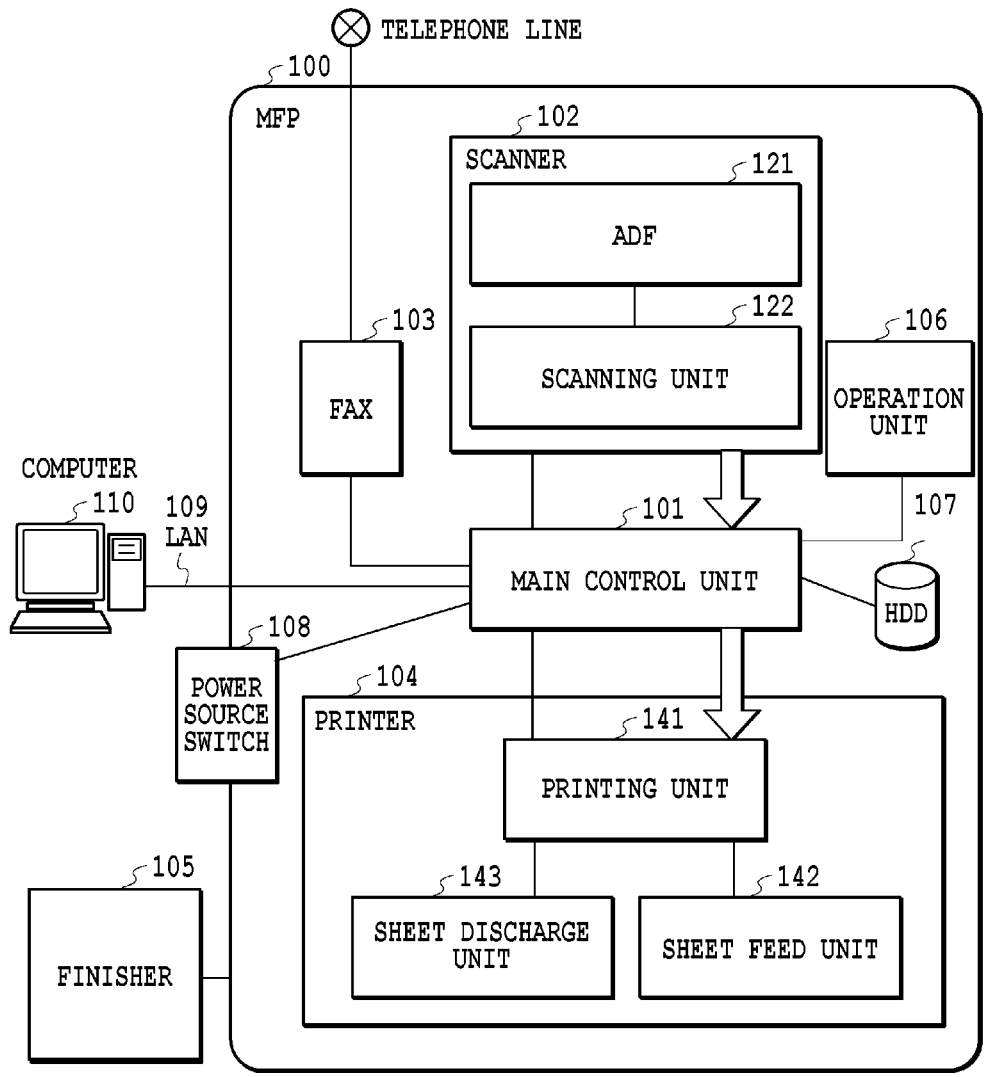
FIG. 1 is a block diagram showing an example of a hardware configuration of an MFP.

In the following, explanation is given by taking the case of an MFP including a plurality of functions as a printing apparatus according to the present embodiment as an example. FIG. 1 is a block diagram showing an example of a hardware configuration of an MFP. An MFP 100 shown in FIG. 1 includes a main control unit 101 corresponding to the controller described previously, a scanner 102, a FAX 103, a printer 104, a finisher 105, an operation unit 106, an HDD 107, and a power source switch 108. The MFP 100 includes a print function, a copy function, a transmission function, a FAX function, and a save function and is connected with a computer 110 via a LAN 109. The print function is a function to analyze PDL (Page Description Language) data received from the computer 100 and to perform printing on a sheet. The copy function is a function to perform printing on a sheet by using image data read by scanning a document. The transmission function is a function to transmit image data read by scanning a document to the computer 110 via the LAN 109. The FAX function is a function to perform facsimile transmission through a telephone line. The save function is a function to save image data read by scanning a document in the HDD 107. The number of computers 110 connected to the MFP 100 may be two or more.

The main control unit 101 centrally controls each device, such as the scanner 102, the FAX 103, the printer 104, and the finisher 105, and performs various jobs. The scanner 102 includes an ADF (Auto Document Feeder) 121 configured to automatically feed a bundle of scan-target documents and a scanning unit 122 configured to optically read an image on a document and to convert the image into image data in a digital format. The image data generated by optically reading a document fed from the ADF 121 is sent to the main control unit 101. The FAX 103 performs transmission and reception of image data via a telephone line. The printer 104 makes up the printing mechanism described previously and forms an image on a printing medium, such as paper, by an electrophotographic method in accordance with image data and outputs the printing medium on which the image is formed. Here, explanation is given by taking the electrophotographic method that uses toner as a color material as an example, but for example, it may also be possible to form an image by another method, such as an ink jet method that uses ink as a color material. The printer 104 includes a sheet feed unit 142 capable of sequentially feeding a sheet one by one from a bundle of sheets, a printing unit 141 configured to print an image on a fed sheet, and a sheet discharge unit 143 configured to discharge a sheet after printing. The finisher 105 is also part of the printing mechanism described previously and performs processing, such as sorting, stapling, punching, and cutting, for a sheet output from the sheet discharge unit 141 and for which printing has been performed. The operation unit 106 includes hard keys to receive various settings and instructions for the MFP 100 from a user and a display to display a processing state. The hard keys include a power-saving button, a copy button, a cancel button, a reset button, a ten-key, a user mode key, etc. It may also be possible to make up the operation unit 106 by, for example, an LCD display having a touch panel function and to receive various settings and instructions via the LCD display. The HDD 107 stores image data, control programs, etc. The power source switch 108 is a switch to switch between on and off of the power source of the MFP 100 and is connected to the main control unit 101. In the case where the power source switch 108 is on, power is supplied to each unit within the MFP 100 and in the case where the power source switch 108 is off, supply of power to each unit within the MFP 100 is suspended. However, even in the case where the power source switch 108 is turned off, supply of power is not suspended immediately but supply of power to each unit is suspended after the end processing of the software and hardware is completed. Further, at this time also, supply of power is maintained for part of the units, such as the circuit to turn on the power source switch 108.

(Configuration of Main Control Unit)

Figure 2:
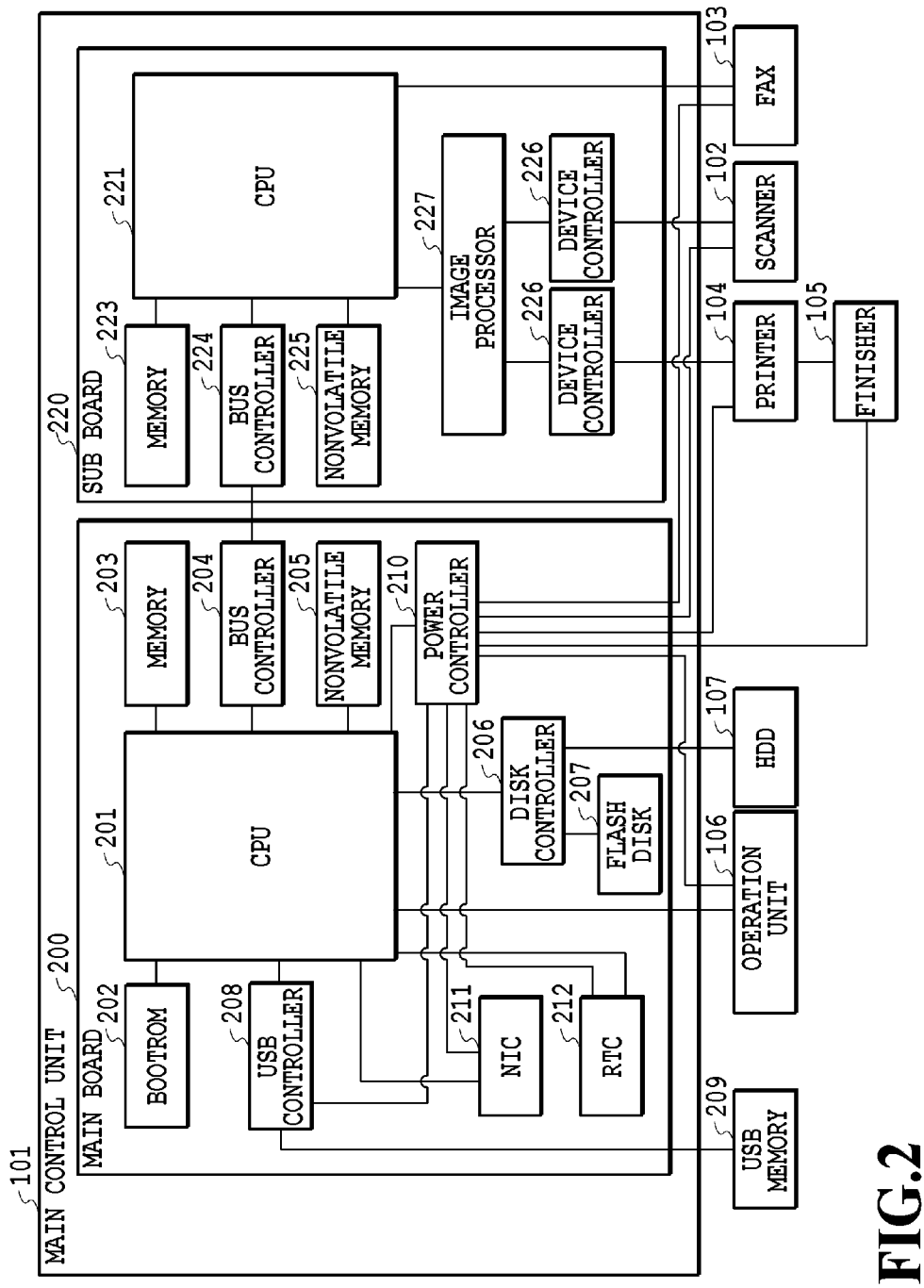
FIG. 2 is a block diagram showing an internal configuration of a main control unit and a relationship between the main control unit and each device or the like within the MFP.

Next, details of the main control unit 101 are explained. FIG. 2 is a block diagram showing an internal configuration of the main control unit 101 and a relationship between the main control unit 101 and each device or the like within the MFP 100. The main control unit 101 includes a main board 200 and a sub board 220. FIG. 2 is a simplified diagram and for example, peripheral hardware, such as chipset, a bus bridge, and a clock generator, relating to the CPU is omitted.

The main board 200 is a so-called general-purpose CPU system. The main board 200 is a central processing unit that controls an entire CPU 201 board. A boot ROM 202 stores a boot program. A memory 203 is, for example, a memory, such as a DRAM, which the CPU 201 uses as a work memory. A bus controller 204 is connected with the sub board 220 and in charge of a bridge function with an external bus. A nonvolatile memory 205 is, for example, a memory, such as a flash memory, capable of storing information even in the case where a power source is shut off. A disk controller 206 controls the HDD 107 and a flash disk 207, such as an SSD, which is a comparatively small-capacity storage device made up of a semiconductor device. A USB controller 208 controls a peripheral device, for example, a USB memory 209, which is connected to the MFP 100 via a USB (Universal Serial Bus).

A power controller 210 controls an interrupt signal from each device, such as the printer 104, and supply of power to each device for each system in accordance with a load. The power controller 210 is connected with the CPU 201, a NIC (Network Interface Controller) 211, an RTC (Real Time Clock) 212, and the USB controller 208. Further, the power controller 210 is also connected with external devices (the operation unit 106 having a soft switch, the scanner 102 having various sensors, the printer 104, the finisher 105) of the main control unit 101.

The sub board 220 includes a general-purpose CPU system whose scale is smaller than that of the main board 200 and image processing hardware. Specifically, the sub board 220 has a CPU 221 and its work memory (memory 223), a bus controller 224, a nonvolatile memory 225, two device controllers 226, and an image processor 227 for image processing. The scanner 102 and the printer 104 connected to the outside of the main control unit 101 transmit and receive image data, respectively, via the device controller 226. The FAX 103 is controlled directly by the CPU 221.

Subsequently, the operation of the main control unit 101 is explained by taking copy processing as an example. In the case where a user gives copy instructions from the operation unit 106, the CPU 201 sends an image read command to the scanner 102 via the CPU 221. The scanner 102 having received the image read command inputs image data obtained by scanning a document to the image processor 227 via the device controller 226. The image processor 227 transfers the image data by DMA to the memory 223 via the CPU 221 and temporarily saves the image data. In the case of confirming that a fixed amount of image data is accumulated in the memory 223, the CPU 201 gives printing instructions to the printer 104 via the CPU 221. The CPU 221 teaches the image processor 227 the address on the memory 223 of the processing-target image data. The image data on the memory 223 is transmitted to the printer 104 via the image processor 227 and the device controller 226 in accordance with a synchronization signal from the printer 104. The printer 104 forms an image in accordance with the image data on a sheet and outputs the printing medium on which the image is formed. In the case of printing of a plurality of copies, the CPU 201 saves the image data on the memory 223 in the HDD 107 and sends the image data from the HDD 107 or the memory 223 to the printer 104 for the second and subsequent copies.

(Power Source Configuration)

Figure 3:
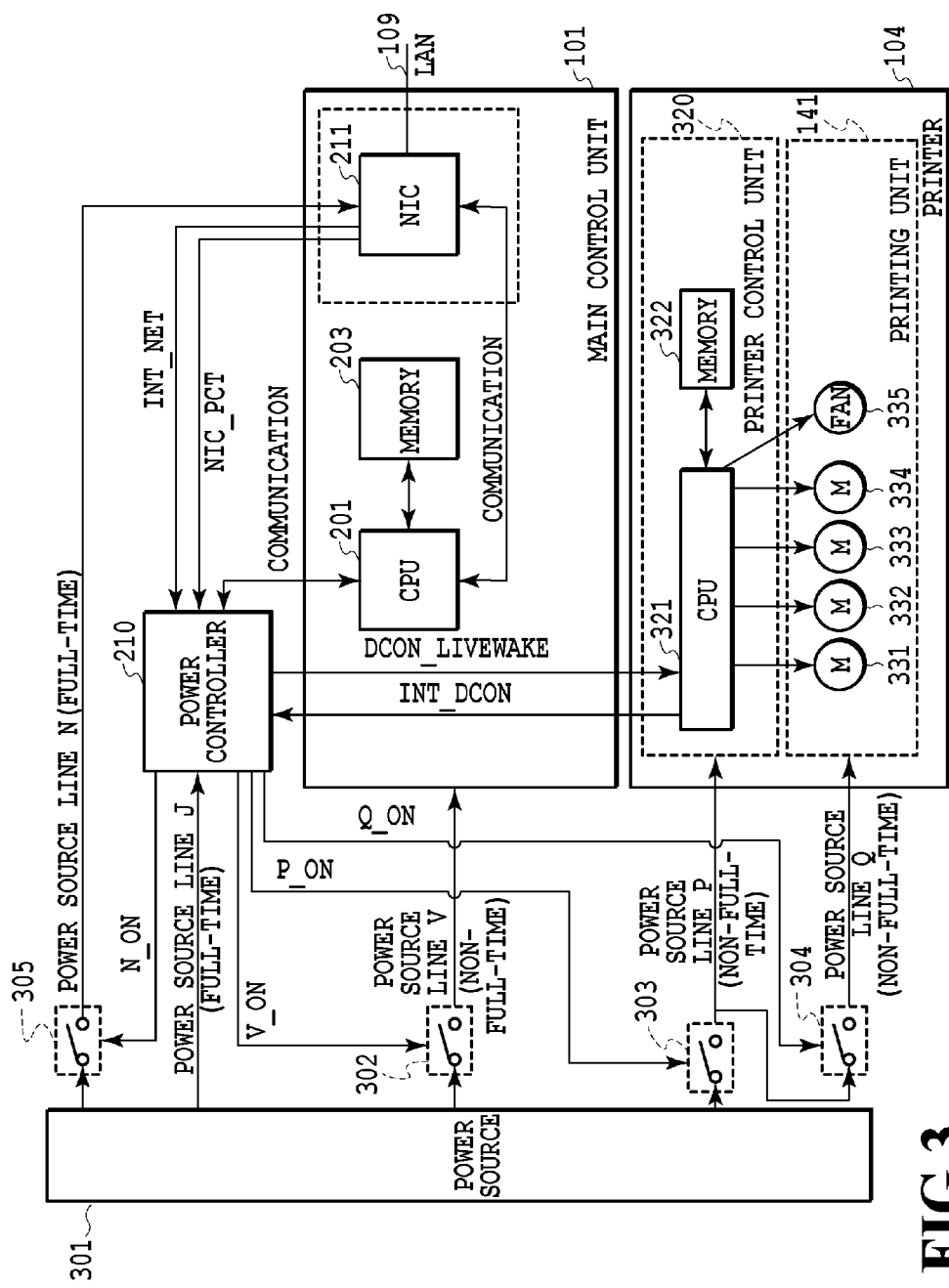
FIG. 3 is a block diagram showing a power source configuration of the MFP.

FIG. 3 is a block diagram showing a power source configuration of the MFP 100. In the following, by focusing attention on the portions relating to the present invention, how a power source is supplied in the MFP 100 is explained. First, to the power controller 210, power is supplied at all times via a first power source line (power source line J) from a power source 301. Because of slight power consumption, while the power source is off, only the power controller 210 is energized and power control is performed.

The power controller 210 is programmed in advance so as to perform predetermined operations specifically, as follows. First, by a first power source control signal (TO signal V_ON), a relay switch 302 is switched and supply of power to the main control unit 101 via a second power source line (power source line V) from the power source 301 is controlled. Further, a plurality of timer values is set by the CPU 201 and while the timer is activated, the power controller 210 performs operations set by the CPU 201.

Further, by a second power source control signal (IO signal P-ON), a relay switch 303 is switched. As a result of this, via a third power source line (power source line P) from the power source 301, supply of power to a printer control unit 320 that is a module belonging to a system (hereinafter, "logic system") whose load is relatively low of the printing mechanism is controlled. The printer control unit 320 has a CPU 321 and a memory 322 and performs various kinds of control relating to printing, such as development and timing of sheet passing.

Further, by a sub signal (IO signal Q_ON) of the second power source control signal, a relay switch 304 is switched. As a result of this, via a sub line (power source line Q) of the third power source line from the power source 301, supply of power to the printing unit 141 or the like, which is a module belonging to a system (hereinafter, "load system") on a side whose load is relatively high of the printing mechanism is controlled. In FIG. 3, fixing units 331 to 334 corresponding to toner of each of CMYK and a FAN 335 in the printing unit 141 are shown schematically. Although omitted in FIG. 3, necessary power is also supplied through the power source line Q to other modules including parts in a drive system, such as a motor, i.e., to the sheet feed unit 142, the sheet discharge unit 143, and further, to the finisher 105. The power source line Q does not need to be a sub line of the power source line P and it is also possible to route a line directly from the power source 301. The relay switch 304 is configured so as to be controlled by the power controller 210, but it may also be possible to make up the relay switch 304 so as to be controlled by the CPU 321 within the printer control unit 320.

The power controller 210 issues predetermined IO signals by the instructions of the CPU 201. One of the target IO signals is a DCON_LIVEWAKE signal connected to the CPU 321 within the printer control unit 320. In the case where the power source of the printer 104 is turned on in the state where the DCON_LIVEWAKE signal is asserted, the printer 104 resumes quietly without performing specific operations accompanied by fixed power consumption. The specific operations include, for example, rotation operations of a motor, a roller, a polygon, etc., temperature adjustment of the fixing units 331 to 334, heat discharge processing by the FAN 335, etc. Although explanation is omitted here, the same power source control as that of the printer 104 is also performed for the scanner 102.

It is possible to implement supply of power for each block described above by a method in which, for example, the relay switch is made up of two systems and at the time of a transition into a sleep mode, only the relay switch connected to the block whose power source is turned off is turned off and the other relay switch is kept in the on state. Then, at the time of shutdown, the relay switches in both the systems are turned off. In this case, the power source control signal is not a binary control signal, but a multivalued control signal in accordance with the energization state. In the following, an example of power source control in accordance with an operation mode is shown. The power controller 210 switches a relay switch 305 by a third power source control signal (IO signal N_ON) and controls supply of power to the NIC 211 via the third power source line (power source line N) from the power source 301. In this manner, power is supplied only to the NIC 211 within the main control unit 101. Unlike other non-full-time power sources, the power source line N is supplied with power not only in the normal mode but also in the sleep mode and thereby enabling network wakeup. At the time of shutdown, power is not supplied unless the setting, such as Wake On LAN, is effective. The power source line N via the relay switch 305 is basically in the state where power is supplied at all times.

Here, the problem of the present invention is reviewed. For example, in the case where the counter data of the fixing units (drums) 331 to 334 is backed up, it is necessary so far to acquire the counter data directly from a nonvolatile memory (not shown schematically) provided in the system to which the drum belongs. Because of this, it is necessary to energize the load system to which the printing unit 141 belongs. However, in recent years, it has been made possible to acquire the counter data without the need to energize the load system by caching the counter data within the module belonging to the logic system, i.e., in the memory 322 within the printer control unit 302. That is, it has been made possible for the CPU 321 of the printer control unit 320 to return the data cached in the memory 322 for a data acquisition request from the CPU 201 of the main control unit 101 without the need to acquire the actual data from a nonvolatile memory in the system to which the drum belongs.

On the other hand, in recent years, the power-saving function has improved and in the case where a user uses the MFP 100, only the device or module corresponding to the function that the user makes use of at this time is energized. As a result of this, the energization state in the MFP 100 has become complicated. That is, there may be a variety of energization states for each device or module, such as a state where a device in the load system is not energized and a state where a device in the load system is energized but the initialization processing is not performed for a module accompanied by sound, at the time of the acquisition request for the counter data from the CPU 201 of the main control unit 101. Consequently, information on a device or module belonging to the load system has begun to be saved within a module in the logic system so that it is possible to acquire necessary data even in the state where a high load device is not energized or in the state where a module that issues sound at the time of operation is not energized. As a result of this, no problem occurs even in the case where supply of power to a device or module in the load system is suspended before the counter data is acquired. It is also considered to send the counter data to the memory 203 of the main control unit 101 from the memory 322 of the printer control unit 320, which is a module in the logic system, and to save the counter data in the memory 203 each time the value of the counter data is updated, but the control such as this is not performed. The reason is that image data is transmitted and received between the main control unit 101 and the printer control unit 320, and therefore, in the case where transmission and reception of the counter data are performed each time the counter data is updated, the printing performance is affected.

However, accompanying an increase in speed and enhanced functionality of the MFP 100, there is a tendency for the number of items and data size of the counter data to increase, and therefore, more time is taken for the backup to save the counter data within a module in the logic system than before. As a result of this, in the case where the printing mechanism is caused to make a transition from the activated state into the suspended state, the situation has occurred in which the period of time during which power is supplied to the printing unit 141 or the like belonging to the load system whose load is relatively high lengthens and the power consumption increases. The present invention focuses attention on this point and an object is to reduce power consumption by suspending supply of power to the system whose load is relatively high in an earlier stage without impeding the backup of the counter data at the time of causing the printing mechanism to make a transition into the suspended state.

Figure 4:
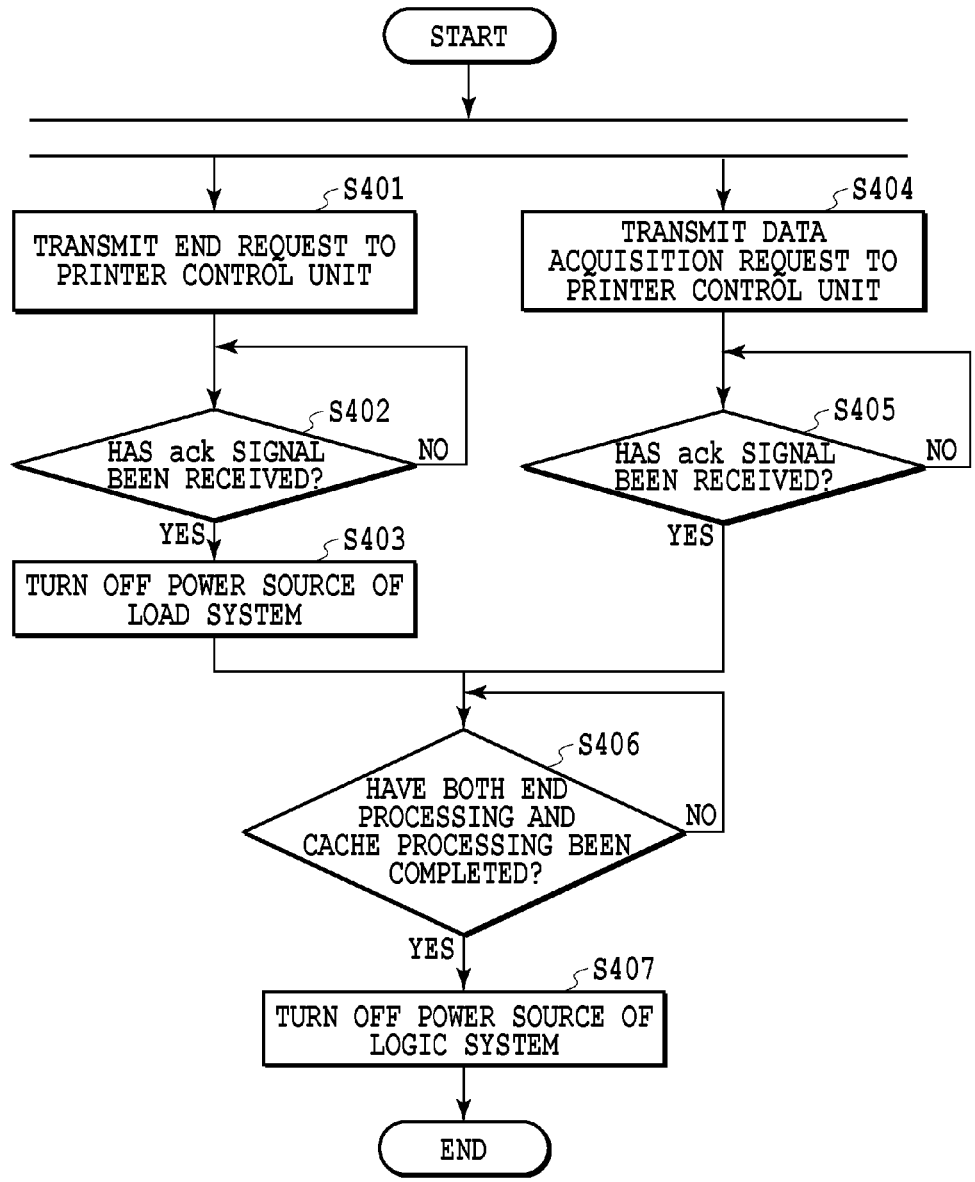
FIG. 4 is a flowchart showing a flow of control at the time of a transition into a suspended state.

Next, the control, which is the feature of the present embodiment, at the time of causing the printing mechanism to make a transition from the activated state into the suspended state is explained. FIG. 4 is a flowchart showing a flow of the control at the time of a transition into the suspended state. The series of processing is implemented by the CPU 201 within the main control unit 101 loading a predetermined program stored in the HDD 107 or the like onto the memory 203 and executing the program. The flow shown in FIG. 4 differs from the conventional one in that supply of power is suspended stepwise for each system with a different load at the time of causing the printing mechanism to make a transition from the activated state into the suspended state. This control at the time of a transition into the suspended state is applied in the case where the printing mechanism is caused to make a transition into the suspended state on the completion of the printing processing at the time of the shutdown of the entire MFP 100 or at the time of the execution of partial supply of power to supply power only to a device to be used of the devices corresponding to each function. Typically, the flow in FIG. 4 is performed on the detection of the start condition to cause the printing mechanism to make a transition from the activated state into the suspended state is established, such as the completion of a print job. In the following, in accordance with the flowchart in FIG. 4, the control at the time of a transition into the suspended state according to the present embodiment is explained. In the flowchart in FIG. 4, each piece of processing at steps 401 to 403 to suspend supply of power to a system whose load is relatively high of a plurality of systems classified according to load and each piece of processing at steps 404 and 405 to back up the counter data are performed in parallel.

At step 401, the CPU 201 transmits the previously described end request to the printer control unit 320. The printer control unit 320 having received the end request performs the end processing that is requested prior to the suspension of supply of power, specifically, the processing including processing to separate the fixing units 331 to 334, processing to lower the lifter of the finisher 105, and processing to reset the drive system using a motor or gear. On the completion of the end processing, the printer control unit 320 returns an ack signal indicating the completion of the end processing to the CPU 201. There is a case where the relay switch 304 in the load system is not turned on and the power source is not turned on at the point in time of the reception of the end request by the printer control unit 320. In this case, it is sufficient to perform the end processing after temporarily turning on the relay switch 304 on a condition that the separation processing of the fixing unit or the like is necessary.

At step 402, the CPU 201 determines whether the ack signal has been received from the printer control unit 320. In the case where the ack signal has been received, the processing advances to step 403. On the other hand, in the case where the ack signal has not been received, the determination is performed again after the elapse of a fixed time and monitoring is continued until the ack signal is received.

At step 403, the CPU 201 gives instructions to suspend supply of power to a device or module belonging to the load system to the power controller 210. Upon receipt of the instructions, the power controller 210 switches the relay switch 304 from on to off by the IO signal Q_ON and shuts off the power source line Q. Due to this, supply of power to the printing unit 141, the finisher 105, etc., whose load is relatively high is suspended.

Up to this processing is the processing to suspend supply of power to the load system whose load is relatively high of the printing mechanism in an earlier stage. In the present embodiment, in parallel to this processing, each piece of processing for the backup shown at steps 404 and 405 below is performed.

At step 404, the CPU 201 transmits an acquisition request for the counter data to the printer control unit 320. The printer control unit 320 having received the acquisition request acquires the most recent value of an item (e.g., the number of sheets passed through the drum) relating to the acquisition request and stores the value within the memory 322 and returns the ack signal to the CPU 201 on the completion of the storage.

At step 405, the CPU 201 determines whether the ack signal has been received from the printer control unit 320. In the case where the ack signal has been received, the processing advances to step 406. On the other hand, in the case where the ack signal has not been received, the determination is performed again after the elapse of a fixed time and monitoring is continued until the ack signal is received.

At step 406, the CPU 201 determines whether both the suspension of supply of power to the load system and the backup of the counter data have been completed. In the case where both have been completed, the processing advances to step 407. On the other hand, in the case where it is not possible to confirm whether both have been completed, the determination is performed again after the elapse of a fixed time and monitoring is continued until the completion of both is confirmed.

At step 407, the CPU 201 gives instructions to suspend supply of power to the device belonging to the logic system to the power controller 210. Upon receipt of the instructions, the power controller 210 switches the relay switch 303 from on to off by the IO signal P_ON and shuts off the power source line P. In this manner, after the completion of the backup, supply of power to the printer control unit 320, which is the module in the logic system whose load is relatively low, is suspended.

The above is the contents of the control at the time of causing the printing mechanism of the MFP 100 to make a transition from the activated state into the suspended state.

In the present embodiment, each piece of processing (steps 401 to 403) to suspend supply of power to the load system and each piece of processing (steps 404 and 405) to back up the counter data are performed in parallel, but the way the processing is performed is not limited to this. For example, it may also be possible to perform each piece of processing to back up the counter data after the completion of each piece of processing to suspend supply of power to the load system.

Further, in the present embodiment, the systems in accordance with the load are classified into the two kinds of system: the load system on the side whose load is high and the logic system on the side whose load is low, but the classification is not limited to this and it may also be possible to classify the systems into, for example, three systems at the three levels: high, medium, and low. What is required is a configuration in which supply of power to the system whose power consumption is relatively high of the printing mechanism is suspended prior to the system to which the module in charge of backing up the counter data belongs.

As above, according to the present embodiment, in the case where the printing mechanism of the printing apparatus is caused to make a transition into the suspended state, the shut-off of the power source to the load system whose load is relatively high and the backup of the counter data are performed in parallel at the same time and then the shut-off of the power source to the system (logic system) whose load is low is performed. Due to this, the order (regularity) in which supply of power to the logic system is suspended after supply of power to the load system is suspended is guaranteed and as a result of this, it is possible to reduce power consumption without impeding the backup of the counter data of consumables or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where a printing mechanism of a printing apparatus is caused to make a transition from an activated state into a suspended state, it is possible to reduce power consumption without impeding backup of counter data of consumables or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-066082 filed Mar. 29, 2016, which is hereby incorporated by reference wherein in its entirety.

What is claimed is:

1. A printing apparatus comprising:
a printing mechanism configured to form an image on a printing medium;
a printing controller configured to control the printing mechanism and to store data relating to the printing mechanism;
a power controller configured to supply power to the printing mechanism and the printing controller, and stop supplying power to the printing mechanism and the printing controller; and
a main controller connected with the printing controller so as to be capable of communication, wherein
the main controller transmits each of a data acquisition request and an end request to the printing controller in accordance with a predetermined condition,
the power controller stops supplying power to the printing mechanism in accordance with a predetermined response for the data acquisition request,
the main controller acquires the data relating to the printing mechanism stored by the printing controller in accordance with the predetermined response for the data acquisition request, and
the power controller stops supplying power to the printing controller after a completion of acquisition of the data relating to the printing mechanism stored by the printing controller.

2. The printing apparatus according to claim 1, further comprising:
a power supplier configured to supply first power to the printing controller and second power higher than the first power to the printing mechanism.

3. The printing apparatus according to claim 1, wherein the data includes at least one of a consumption state of a material for forming an image on the printing medium, a number of the printing media, and an energization time of the printing apparatus.

4. The printing apparatus according to claim 1, wherein the printing mechanism is a fixing unit or a fan.

5. The printing apparatus according to claim 1, wherein the main controller gives instructions to perform processing to reset a drive system relating to printing processing to the printing mechanism, and
the power controller performs control so as to suspend supply of power to the printing controller after the reset processing is completed.

6. A control method of a printing apparatus including:
a printing mechanism configured to form an image on a printing medium;

a printing controller configured to control the printing mechanism and to store data relating to the printing mechanism;

a power controller configured to supply power to the printing mechanism and the printing controller, and to stop the supply of power to the printing mechanism and the printing controller; and a main controller connected with the printing controller so as to be capable of communication, the control method comprising:

a step of, by the main controller, transmitting each of a data acquisition request and an end request to the printing controller in accordance with a predetermined condition;

a step of, by the power controller, stopping the supply of power to the printing mechanism in accordance with a predetermined response for the data acquisition request;

a step of, by the main controller, acquiring the data relating to the printing mechanism stored by the printing controller in accordance with the predetermined response for the data acquisition request; and a step of, by the power controller, stopping the supply of power to the printing controller after a completion of acquisition of the data relating to the printing mechanism stored by the printing controller.

7. The printing apparatus according to claim 1, wherein the predetermined condition is a shutdown condition for shutting down the printing apparatus.

8. The printing apparatus according to claim 1, wherein the printing mechanism is a fixing unit, and the printing controller separates the fixing unit in accordance with the predetermined response.

9. The printing apparatus according to claim 1, wherein the printing mechanism is a lifter of a finisher, and the printing controller moves the lifter in accordance with the predetermined response.

10. The printing apparatus according to claim 1, wherein the printing mechanism is a motor, and the printing controller drives the motor in accordance with the predetermined response.

11. A printing apparatus comprising:

a printing mechanism configured to form an image on a printing medium;

a printing controller configured to control the printing mechanism and to store data relating to the printing mechanism;

a power controller configured to supply power to the printing mechanism and the printing controller, and to stop supplying power to the printing mechanism and the printing controller; and a main controller connected with the printing controller so as to be capable of communication, wherein the main controller acquires the data relating to the printing mechanism stored by the printing controller in accordance with a predetermined condition, and the power controller stops supplying power to the printing mechanism without waiting for a completion of acquisition of the data relating to the printing mechanism stored by the printing controller.

12. The printing apparatus according to claim 11, further comprising:

a power supplier configured to supply first power to the printing controller and second power higher than the first power to the printing mechanism.

13. The printing apparatus according to claim 11, wherein the data includes at least one of a consumption state of a material for forming an image on the printing medium, a number of the printing media, and an energization time of the printing apparatus.

14. The printing apparatus according to claim 11, wherein the printing mechanism is a fixing unit or a fan.

15. The printing apparatus according to claim 11, wherein the main controller gives instructions to perform processing to reset a drive system relating to printing processing to the printing mechanism, and the power controller performs control so as to suspend supply of power to the printing controller after the reset processing is completed.

16. The printing apparatus according to claim 11, wherein the power controller stops supplying power to the printing controller after a completion of acquisition of the data relating to the printing mechanism stored by the printing controller.

17. The printing apparatus according to claim 11, wherein the predetermined condition is a shutdown condition for shutting down the printing apparatus.

18. The printing apparatus according to claim 11, wherein the printing mechanism is a fixing unit, and the printing controller separates the fixing unit in accordance with the predetermined response.

19. The printing apparatus according to claim 11, wherein the printing mechanism is a lifter of a finisher, and the printing controller moves the lifter in accordance with the predetermined response.

20. The printing apparatus according to claim 11, wherein the printing mechanism is a motor, and the printing controller drives the motor in accordance with the predetermined response.

21. A printing apparatus comprising:

a printing mechanism configured to form an image on a printing medium;

a printing controller configured to control the printing mechanism and to store data relating to the printing mechanism;

a power controller configured to supply power to the printing mechanism and the printing controller, and stop supplying power to the printing mechanism and the printing controller; and a main controller connected with the printing controller so as to be capable of communication, wherein the main controller transmits a data acquisition request in accordance with a predetermined condition and acquires the data relating to the printing mechanism stored by the printing controller in accordance with a predetermined response for the data acquisition request, the main controller transmits an end request to the printing controller without waiting for a completion of acquisition of the data relating to the printing mechanism stored by the printing controller, and the power controller stops supplying power to the printing mechanism in accordance with a predetermined response for the end request.

22. The printing apparatus according to claim 21, further comprising:

a power supplier configured to supply first power to the printing controller and second power higher than the first power to the printing mechanism.

23. The printing apparatus according to claim 21, wherein the data includes at least one of a consumption state of a material for forming an image on the printing medium, a number of the printing media, and an energization time of the printing apparatus.

24. The printing apparatus according to claim 21, wherein the printing mechanism is a fixing unit or a fan.

25. The printing apparatus according to claim 21, wherein the main controller gives instructions to perform processing to reset a drive system relating to printing processing to the printing mechanism, and the power controller performs control so as to suspend supply of power to the printing controller after the reset processing is completed.

26. The printing apparatus according to claim 21, wherein the power controller stops to supply power to the printing controller after a completion of acquisition of the data relating to the printing mechanism stored by the printing controller.

27. The printing apparatus according to claim 21, wherein the predetermined condition is a shutdown condition for shutting down the printing apparatus.

28. The printing apparatus according to claim 21, wherein the printing mechanism is a fixing unit, and the printing controller separates the fixing unit in accordance with the predetermined response.

29. The printing apparatus according to claim 21, wherein the printing mechanism is a lifter of a finisher, and the printing controller moves the lifter in accordance with the predetermined response.

30. The printing apparatus according to claim 21, wherein the printing mechanism is a motor, and the printing controller drives the motor in accordance with the predetermined response.

* * * * *